Nov. 6, 1928.                                                1,690,255
H. C. SNOOK
SYSTEM FOR CONVERTING SOUND WAVES INTO ELECTRICAL WAVES
Original Filed Sept. 22, 1922        2 Sheets-Sheet 1

Inventor:
H. Clyde Snook
by ℰ.W. Adams Atty.

Patented Nov. 6, 1928.

1,690,255

UNITED STATES PATENT OFFICE.

HOMER CLYDE SNOOK, OF SOUTH ORANGE, NEW JERSEY, ASSIGNOR TO WESTERN ELECTRIC COMPANY, INCORPORATED, OF NEW YORK, N. Y., A CORPORATION OF NEW YORK.

SYSTEM FOR CONVERTING SOUND WAVES INTO ELECTRICAL WAVES.

Original application filed September 22, 1922, Serial No. 589,813. Divided and this application filed September 23, 1924. Serial No. 739,330.

This invention relates to methods of and means for the distortionless conversion of sound waves into electrical waves.

This application is a division of copending application No. 589,813, filed September 22, 1922, by H. C. Snook.

An object of the invention is to provide means whereby sound waves may be converted into electric waves. A feature of this invention is the provision of means whereby electric waves so formed may be employed for modulating a high frequency carrier wave for transmission to distant points.

A further feature of the invention resides in an arrangement whereby sound waves may be used to control an ionized body of gas to produce electrical variations of audible frequency which may be used to modulate a carrier wave.

A further feature is the substitution of a volume of ionized air in place of a magnetic membrane to be acted upon by sound waves produced in the surrounding atmosphere.

Figure 1:
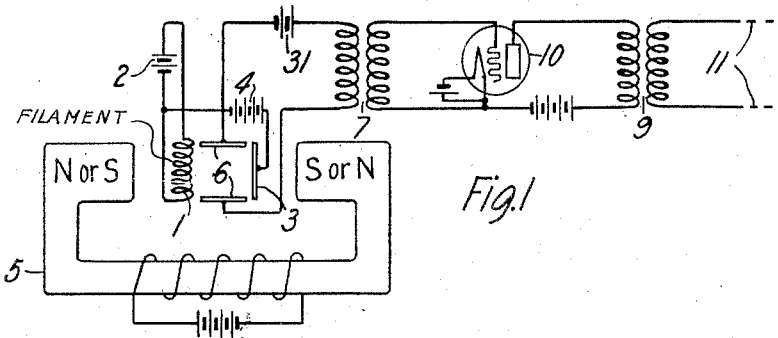

In such a converting arrangement it is necessary to operate a thermionically active conductor in an unevacuated space. Hence, the invention has for a further object the provision of means whereby such an ionic emitter may be maintained electrically active in the open atmosphere or in a suitable space enclosed by a plastic membrane and filled with a suitable gas. The invention is more particularly described in connection with the accompanying drawings, wherein Fig. 1 is a converting system whereby sound waves occurring in the atmosphere may be converted into electrical waves and caused to modulate a carrier wave. Figs. 2, 3, 4, 5, 6, 7, and 8 are sound converting arrangements alternative to that disclosed in Fig. 1. Fig. 9 illustrates an arrangement in which the converter is surrounded by a suitable gas.

Referring more particularly to Fig. 1 a filament 1 is heated by a battery 2 or other suitable means and caused to become electronically active. Adjacent to and opposite the filament is an anode 3 having an external connection to the filament through a battery 4 having a suitable terminal electromotive force. An electromagnet 5 of suitable field strength is located with its poles longitudinally arranged with respect to the axes connecting the filament 1 and the anode 3. Electrodes 6 are connected to the terminals of transformer 7 which is connected to the input circuit of amplifier 10. A battery 31 supplies the circuit of electrodes 6 with suitable energy. The output of amplifier 10 is connected to the primary of transformer 9 for impressing waves upon a carrier line 11 for modulation thereof. The ionized stream flowing between electrodes 1 and 3 may be acted upon by speech or other sound waves as shown at 12 in Fig. 2. A wave variation of sound frequency results in the speech frequency circuit of which electrodes 6 and the primary winding of transformer 7 form a part. It is readily seen then that this arrangement constitutes what may be recognized as a microphone. The alternate condensation and rarefaction of the atmospheric space occupied by the ionized stream due to the incoming sound waves changes the impedance of circuit 6—31—7 with consequent changes in the current flowing therein.

Figure 2:
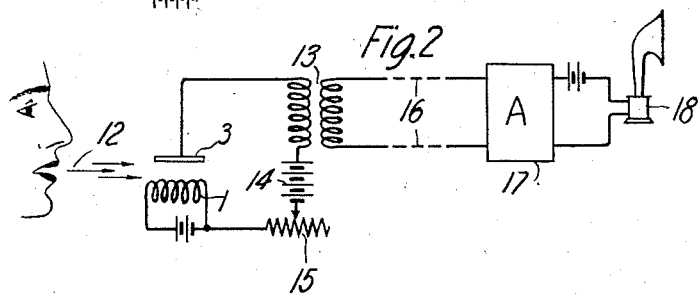

In Fig. 2 the sound waves as shown by the arrows at 12, act upon the ionized stream between electrodes 1 and 3 to vary the impedance of the associated circuit in which are included the primary of transformer 13, battery 14 and regulating resistance 15. The waves are then transmitted over line 16 to any distant point where, after amplification by means of amplifier 17, they may be reproduced in loud speaker 18 or by any other well known means.

Figure 3:
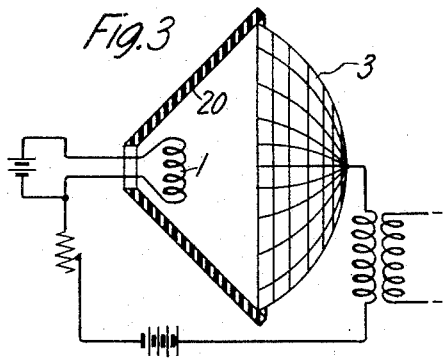

The arrangement of Fig. 3 differs from Fig. 2 in that the anode 3 is in the form of a hemispherical wire basket thus permitting sounds existing in the neighborhood of the device to reach the ionized stream. In order to assist the sound waves a conical protector 20 having hard deflecting walls of insulating material partially surrounds the space occupied by the stream. With this device sound waves directed toward the stream will be concentrated because of the reflection caused by the protector 20.

Figure 4:
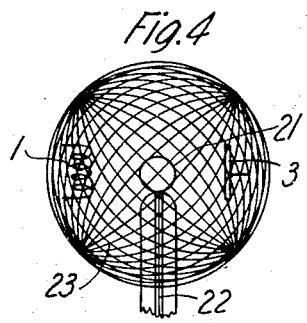

In the arrangement of Fig. 4 filament 1 and anode 3 are arranged in a manner similar to that of Fig. 1. However, one of the speech output electrodes corresponding to the electrode 6 of Fig. 1 is arranged in the center portion as indicated at 21 and has an insulated lead-in connection 22. The other electrode is in the form of a hollow spherical conducting cage 23 which has the remaining electrodes contained within itself and has the electrode 21 at the geometrical center. With this apparatus it is not necessary that the sound waves be directed toward the stream but any sound occurring within the room in which the apparatus is located may have easy access to the ionized stream.

Figure 5:
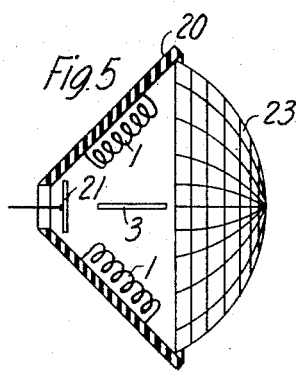

In Fig. 5 several electron emitting filaments 1 arranged in the form of a frustum of a cone are associated with the anode 3. The speech output electromotive force is applied to the electrodes 21 and 23, the latter of which is in the form of a hemispherical metal cage or basket, similar in form to the anode of Fig. 3 and is associated with a hard sound reflecting cone 20 as in Fig. 3. The filaments are preferably mounted on cone 20.

Figure 6:
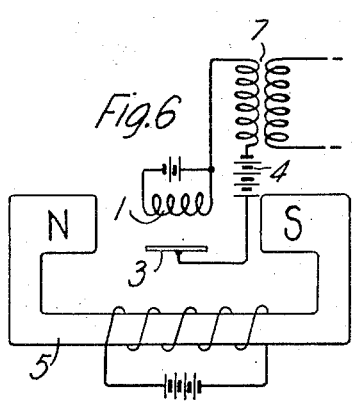

In Fig. 6 the output circuit for the wave representing the sound to be converted into electrical energy is directly in series with the cathode, anode circuit 1, 4, 3 as in the case of Fig. 2 but a transverse magnetic field is superimposed upon the region which the ions traverse in traveling from the cathode 1 to the anode 3. This magnetic field is provided with a suitably energized electromagnet 5.

Figure 7:
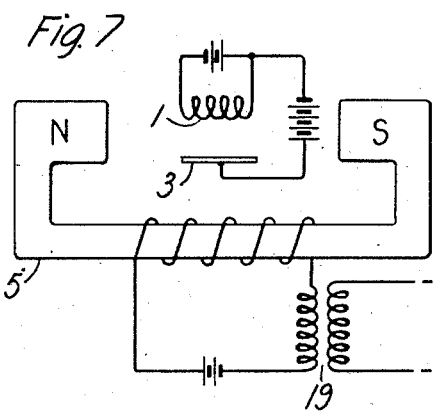

In Fig. 7 the output circuit for the waves controlled by the ionic stream is superimposed upon the uni-directional current circuit of the electromagnet 5. In this case, transformer 19 is the output transformer. A constant transverse electromagnetic field is thus provided upon which is superimposed electromagnetic variations resulting from the variations in the ionic stream, due to contact with sound waves to be converted.

Figure 8:
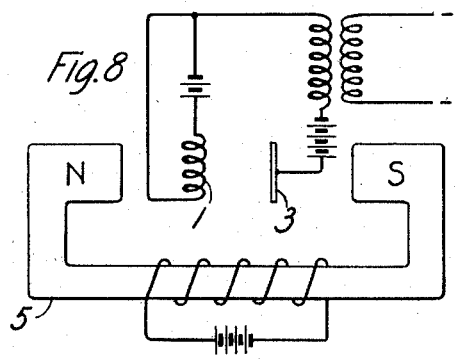
Figure 9:
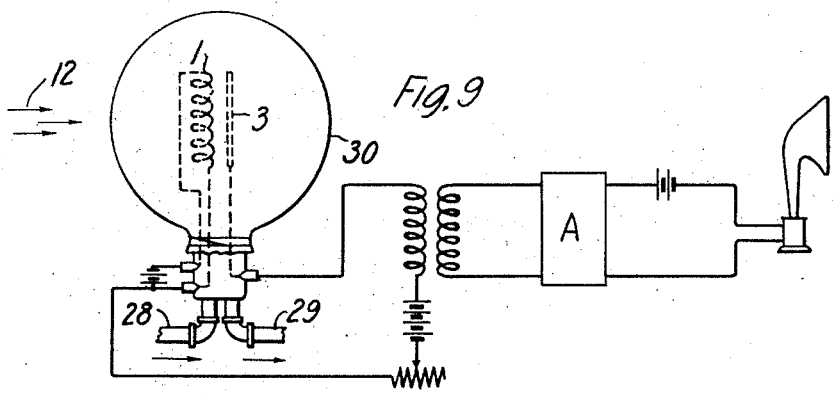

Fig. 8 differs from Fig. 6 in that a longitudinal magnetic field is produced by the electromagnet 5, that is to say, the magnetic lines of force are in general parallel to the paths taken by ions traveling between the cathode 1 and anode 3.

Fig. 9 illustrates an arrangement for enclosing the electron emitting filament and its associated anode, if desired, in a plastic wall membrane within which is contained suitable gases such as nitrogen, hydrogen, argon or a suitable mixture of these or other gases. It is particularly desirable to exclude gases which exercise a so-called "poisoning" action upon certain common used forms of thermionic electron emitters, such as platinum, tungsten or alkaline-earth, oxide-coated platinum wires. Furthermore, as has been published by Mr. O. W. Richardson and others, the presence of gaseous hydrogen, even in minute quantities, greatly increases the thermionic emission from such electron emitters. In Fig. 9, cathode 1 and anode 3 are surrounded by a thin rubber membrane 30 resembling a toy balloon or some other equivalent air-tight membrane. The gas may be supplied through an input pipe 28 and led off through an output pipe 29 each of which may be provided with suitable stop cocks or other means for regulating the flow. In particular it is contemplated to supply gaseous hydrogen and some other inert gas such as nitrogen. This mixture may be very conveniently produced by supplying to the space surrounding the electrodes gaseous ammonia which upon being disassociated by the electric discharge will break down into gaseous hydrogen and gaseous nitrogen. Consequently, there results increased emission of negative electrons from the electron emitter and an elimination of the so called "poisoning" action of gaseous oxygen. This arrangement for surrounding an electron emitter with some inert or other gas or a mixture of gases and excluding ordinary atmosphere is applicable to arrangements such as shown in Figs. 1 to 8, and other modifications not illustrated as well as Fig. 9. The electrode arrangement and input supply of Fig. 9 is generally similar to that of Fig. 2.

Reference will now be made to the operation of the sound converter of Fig. 1. It is contemplated that the region between and surrounding the electrodes 1 and 3 should consist of ionized air but this ionized space will not have such a high degree of ionization that it possesses the appearance and characteristics which are recognized as characteristic of a Voltaic arc. On the contrary it is contemplated that this space shall have within it ionized carriers which are fewer per unit volume within this space than the density of such carriers within the ionized stream of a so-called Voltaic arc. It is proposed to use ionized spaces in open atmospheric air and operates upon them by directing the sound waves thereat so as to be able to transfer energy from the non-ionized atmospheric air in the vicinity without the agency of a diaphragm of solid material possessing mechanical mass of any appreciable amount. In order to transfer energy directly from the atmosphere, it is contemplated to influence the charged electrical carriers thus produced in an ionized space. These small particles ionized molecules or ions or charged molecular aggregates, are the means for transferring to electrical circuits the energy of the molecules of the non-ionized atmospheric air, that is, in the form of heat or sounds, by causing the ionized particles to collide with the non-ionized molecules in the air. The ionized spaces which are used may be ionized not only by the means hereinbefore described but by the use of such known methods as flames burning in open air, intense beams of X-rays through a space in atmospheric air, by the transmission of radiations from a radioactive substance through a space in atmospheric air or by the transmission of ultraviolet or other kinds of light through a space in atmospheric air or by the use of incandescent electron emitting bodies other than those described. Such electron emitting bodies may be incandescent metals coated with oxides of the alkaline earths or other substances, incandescent oxides of thorium, or other electron emitter.

In such arrangements as Fig. 1 the elements 6 constitute electrodes immersed within or adjacent to the ionized space. They are so arranged as to collect more or less of the large ions and thus transfer electrical variations to the output circuit. By being in contact with the non-ionized adjacent air sound vibrations existing in the adjacent air modify the impedance in the space between the elements 6. In accordance with this method of the variation of impedance in the ionized space, it is not necessary that the ions of one kind of sign predominate in number over those of the opposite kind of sign, providing the density of the carriers in the ionized space is low enough to permit the electric field from the electrodes 6, energized by the battery 31, to penetrate appreciably into the ionized space. That is to say, the density of the carriers of one kind of sign must not be great enough to shield the electric field from the carriers of the opposite sign. On the other hand, if the carriers of one kind of sign predominate, it is easily seen that the carriers may be deflected by the electric field between the control electrodes. In Fig. 1 the magnetic field may be transverse as in Fig. 6, if desired.

The arrangements of Figs. 2, 3, 6 and 8 are illustrative of a method of variation of impedance between additional electrodes, provided they are supplied, and the bulk of the carriers between the anode and the cathode in each said instance are charged ionic carriers of one kind of sign of molecular magnitude. One method of accomplishing this predominance of charged carriers of one kind of sign of molecular magnitude is to have the electron emitting element 1 not emit negative electrons but instead to make it an emitter of positive ions and to have these positive ions traverse the space between the cathode and anode, which are maintained at a given potential, such that at no time in their flight across this space will these positively charged carriers of molecular magnitude have acquired a velocity sufficient to ionize the air within the space.

Another method of accomplishing the predominance of charged carriers of one kind of sign of molecular magnitude is to maintain a potential gradient in the space between the negative electron emitter 1 and its cooperating anode so small that the electrons do not, on the average, attain sufficient velocity to ionize the air molecules in the space. The negative electrons then attach themselves to some of the uncharged air molecules and heavy negative ions and molecular aggregates are thus obtained. The density of the charged carriers within the ionized space is not great enough so that the carriers of one kind of sign, either positive or negative, exercise a strong or large shielding action upon the carriers or the other kind of sign. In the case of electric arcs there is an approximately equal number of positive and negative carriers and electrodes immersed within such an ionized arc stream or adjacent to it, exercise little influence upon the arc stream when these electrodes are lectrostatically charged because of the shielding action of the carriers of one kind of sign upon the other. That is to say, the electrostatic field from the influencing electrodes does not penetrate well into the ionized space because of the relatively great density of the carriers of both kinds of sign per unit volume for which reason relatively low densities of ionization are made use of in the present instance, as hereinbefore stated.

In the arrangement of Fig. 6 the magnetic field is transverse to the ionized field and the space between the output electrodes. The audible variation in the non-ionized air in the vicinity of the cathode and anode bring about audio frequency variations of the ionizing current. There is thus provided a means of varying the energy in the space in the vicinity of the cathode and anode, 1 and 3 in synchronism with the audible sounds to be converted.

In Fig. 7 the ionization current is transverse to the audio frequency magnetic field. Sound vibrations occurring in the non-ionized air cause the sheet of ionized air which is steadily ionized by a steady direct current to be moved back and forth causing pulsations of flux across the space between the poles of the magnet. The sheet of ionized air occupies the bulk of space between the poles of the magnet which causes the variations of currents to occur in the output circuit corresponding to and constituting the undistorted speech waves.

In Fig. 8 the ionization current is located in a longitudinal magnetic field. The motion of the charged carriers will be in the form of helices or spirals around the line of magnetic flux.

It is possible in connection with the preceding arrangement to make use of electrostatic or electromotive fields which are oblique with respect to each other or to the ionization field or both. In this case they will have both the transverse and the longitudinal components.

The disclosures herein are schematic and are not intended to indicate dimensions either electrically or mechanically. The general dimensions will be known to those skilled in the art from a study of experimental data already published in the general literature of ionization and the necessary dimensions for producing the best results in any individual case are necessarily determined by adjusting the apparatus to obtain the maximum results.

Having described various methods, systems, apparatus, and elements cooperating to produce a sound converting system, the novel features believed to be inherent in the invention are set forth in the appended claims.

What is claimed is:

1. An arrangement for converting sound into electrical changes which comprises means for establishing an ionized field in a body of gas exposed to variations in pressure due to sound, means for superimposing thereon a steady electromagnetic field and means for producing an electrostatic field in said body of gas.

2. The method of producing electrical changes in a circuit which consists in producing an ionized path in said circuit, applying an electrostatic field transverse said path, and a steady magnetic field longitudinal of said path and exposing said path directly to sound waves.

3. In a device for the translation of sound into electrical changes, a cathode and an anode in spaced relation, the space therebetween being exposed to pressure vibrations due directly to sound without the cooperating of any movable mass, means for subjecting said space to an electrostatic field, and means for subjecting said space to a steady magnetic field, said electrodes being disposed in said magnetic field.

4. In a device for the translation of sound into electrical changes, a cathode and an anode in spaced relation, the space therebetween being unevacuated and exposed to pressure vibrations due to sound, means for subjecting said space to a static potential, said potential being at all times too small to produce substantial ionization of the gas in said space, and means for subjecting said space to a steady magnetic field having one pole on one side of said space and the opposite pole on the other side.

5. In a device for translating sound into electrical changes, a cathode, an anode, means for producing a potential difference between said electrodes, the space between said electrodes being open to the atmosphere whereby it is subjected to pressure vibrations due to sound and said potential difference being at all times too small to produce substantial ionization of the atmosphere in said space, and a pair of concentric electrodes for subjecting said space to a static potential, the outer of said concentric electrodes consisting of a conducting cage through which the sound waves may freely pass to the space between the anode and cathode.

In witness whereof, I hereunto subscribe my name this 22nd day of September A. D., 1924.

H. CLYDE SNOOK.